Sept. 12, 1967  A. PITNER  3,341,263
COMBINED JOURNAL AND THRUST BEARING
Filed March 30, 1965
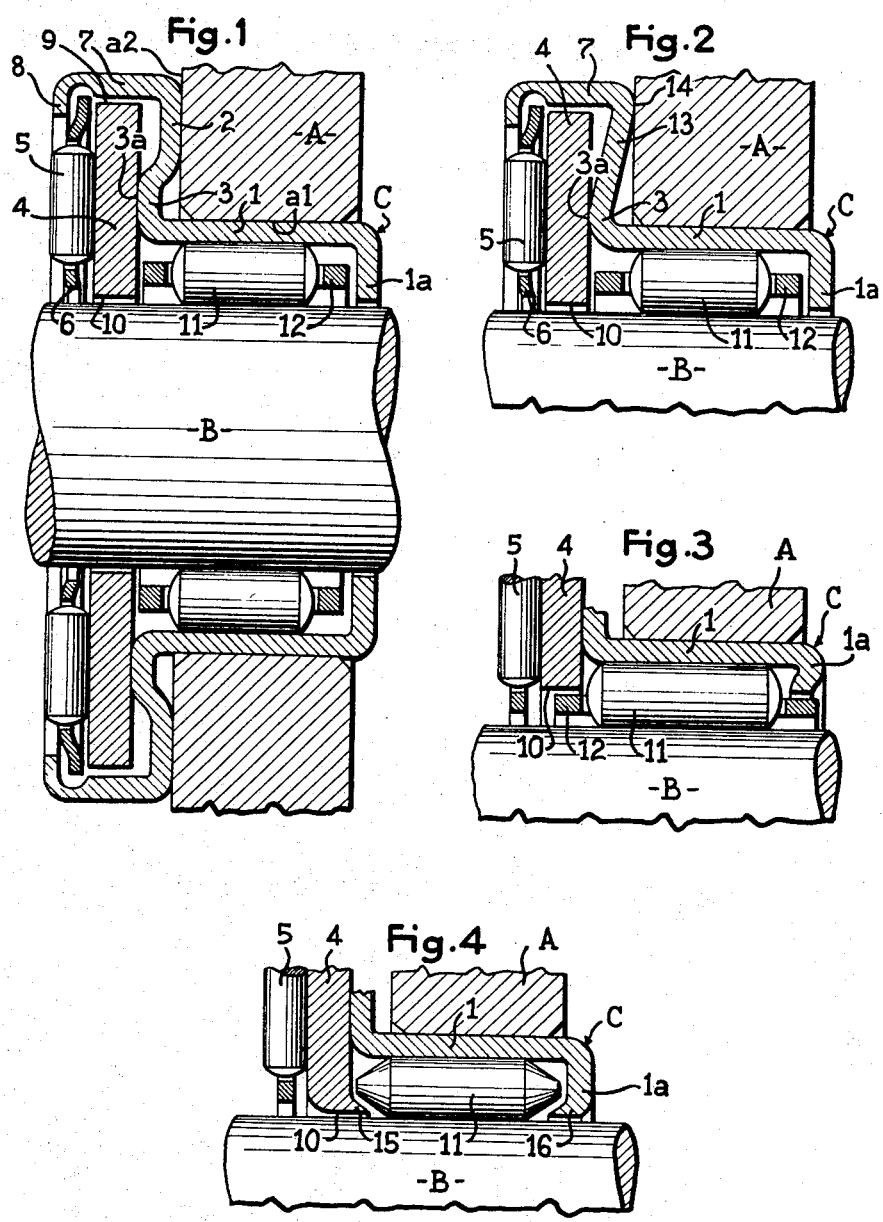

United States Patent Office 3,341,263
Patented Sept. 12, 1967

3,341,263
COMBINED JOURNAL AND THRUST BEARING
Alfred Pitner, Paris, France, assignor of one-half to Nadella S.A., Rueil-Malmaison, France, a corporation of France
Filed Mar. 30, 1965, Ser. No. 443,868
Claims priority, application France, Apr. 7, 1964, 969,967
23 Claims. (Cl. 308—174)

The present invention relates to bearings of the combined type comprising a journal or radial bearing having needles or small rollers and a thrust bearing having needles or rollers and provided with a radial flange integral with the cylindrical ring of the journal bearing and adapted to transmit to an element surrounding the bearing, through the rolling elements, the thrust exerted by a shoulder integral with the shaft or machine component around which the journal bearing is mounted.

Whether the ring and flange assembly is obtained by machining and then grinding after heat treatment or by a press operation, it is difficult to obtain a flange which is both plane and perpendicular to the axis of the bearing. Further, when mounting the bearing, at least in respect of bearings obtained by a press operation, deformations thereof are liable to occur. Finally, in the operation of these bearings the axial loads are not always centered. As a consequence of these factors—namely, lack of perpendicularity owing to the construction of the bearing or to the mounting thereof or to both these reasons, and loads offset from the axis—and moreover as it concerns needles or small rollers, very high forces are concentrated at the ends of the rolling elements and this is incompatible with rational working conditions. Indeed, it is necessary that these needles or small rollers transmit the load mainly through their centre part, the forces at the ends being admissible only in a secondary manner and at least simultaneously with those acting on the centre part.

The object of the present invention is to preclude concentration of forces at the ends of the needles or like rolling elements. This is achieved owing to the fact that there is provided in the thrust bearing an annular rolling plate one of the faces of which constitutes a thrust race whereas the other face is applied against an annular support surface which forms part of the flange and whose radial extent is less than the length of the generatrices of the rolling elements and is located preferably substantially in alignment with the centre region of these generatrices.

According to the invention, on each side of the support surface, which is in the form of a circular boss or rib, the annular rolling plate is somewhat in overhanging relation or supported in a less positive manner than on said surface so that, on condition that the thickness of the plate has an appropriate value depending on the support surface and on the axial thrust supported, the forces which might be applied to the ends of the needles create an elastic deformation deformation of the plate the effect of which is to transfer the main stresses to the centre zone of the rolling elements, namely in the region of the part of the plate which bears against the circular boss or rib constituting said support surface.

According to the invention, the presence of this circular boss or rib in a zone which is substantially in the extension of the part of the bearing subjected to the radial loads permits a more direct transmission of the forces for mounting this part so that, when mounting there is avoided application of forces on the peripheral parts with the consequential avoidance of deformations which might even adversely affect the surface condition of the element, bearing in mind, for example, that cracks could occur as a result of the heat treatment.

Further, owing to the independence of the flange (integral with the ring of the journal or radial bearing) and of the annular rolling plate, it is possible in accordance with the invention to extend said plate inwardly so that it is in the vicinity of the shaft and thus employ longer rolling elements and consequently increase the axial or thrust capacity of the bearing for a given outside diameter thereof.

According to another feature of the invention, the radial flange is extended axially so as to constitute a cylindrical skirt encompassing the rolling plate with clearance, the free edge of the skirt being adapted to constitute retaining means for both the rolling plate and the cage containing the rolling elements.

Owing to this arrangement, the journal bearing and thrust bearing assembly is inseparable and, moreover, the independent rolling plate is unaffected by the radial contraction which the ring-flange-skirt assembly could undergo when the journal bearing is mounted with a force fit in the bore of the element to be equipped with the bearing.

Further features and advantages of the invention will be apparent from the ensuing description with reference to the accompanying drawings to which the invention is in no way limited.

In the drawings:

FIG. 1 is an axial sectional view of a combined thrust and journal bearing according to one embodiment of the invention, and FIGS. 2–4 are partial axial sectional views of the other embodiments of the combined bearing according to the invention.

In FIG. 1, A designates the wall of a support through which a shaft B extends with interposition of a combined journal and thrust bearing.

Fitted in a bore $a^1$ in the wall A is the cylindrical portion 1 of a sheet metal sleeve C which has been stamped drawn and calibrated in accordance with a known technique, said sleeve containing needles 11 located in a cage 12. This sleeve comprises a plane radial portion 2 which rests against the plane face $a^2$ of the wall A and is connected to the cylindrical portion 1 by a projecting portion 3 constituting a support boss or rib for a plate 4 which encompasses with clearance the shaft B and acts as a thrust race for elements 5, such as needles, maintained in a grid or cage 6. The plane portion 2 is extended axially by a second cylindrical portion 7 which acts as means for centering the plate 4 and whose free edge 8 is flanged over inwardly toward the axis so as to act as axial retaining means for the thrust bearing assembly consisting of the elements 4, 5 and 6. As the cage 12 of the journal or radial bearing is itself retained axially between the end 1a of the cylindrical portion 1, which is flanged over inwardly toward the axis of the bearing, and the part of the face of the plate 4 adjacent the shaft, this plate bearing against the boss 3, the component parts of the combined bearing are in fact retained within the sleeve C.

The centering portion 7 is spaced with a marked clearance from the outside diameter 9 of the independent plate 4 so as to preclude any interaction between these elements as a result of any deformation of the journal part when mounting the bearing in the housing A (for example contraction of this part) or of the independent plate 4 when under load in service.

Whereas in FIG. 1 the boss or rib 3 has a plane support surface 3a, the latter has a toric shape in FIG. 2 which is suitable when the loads are light. The toric surface 3 is then connected by an oblique surface 13 to a second toric surface 14 which bears against the wall A. In both cases, the bearing surface 3a has a radial dimension less than the length of the needles 5 so as to avoid concentrations of forces at the ends of needles.

In FIG. 3, the diameter of the bore 10 of the rolling plate 4 is greater than that shown in FIG. 1 so that this bore, in combination with the flange portion 1a of the cylindrical portion 1 of the sleeve C, serves to center the cage 12.

FIG. 4 illustrates an embodiment of a combined bearing in which the needles of the journal or radial bearing contact each other. In this embodiment, the edge of the rolling plate 4 and the edge of the flange portion 1a nearest the shaft B have retaining lips 15 and 16 respectively for the needles 11.

Although specific embodiments of the invention have been described, many modifications and changes may be made therein without departing from the scope of the invention as defined in the appended claims.

Thus, the independent plate 4 could include means for retaining the grid 6 for the needles 5, as described in the French patent application filed by the applicants on March 1, 1957.

Further, the boss or rib 3 could be treated selectively so as to impart thereto a hardness less than that of the cylindrical portion 1 acting as a race for the needles of the journal part of the bearing, thereby avoiding any excessive stress in this rib when the cylindrical portion 1 is fitted with deformation of the latter, that is, fitted with an interference fit in the bore $a^1$.

Having now described my invention what I claim as new and desire to secure by Letters Patent is:

1. A combined thrust and journal bearing comprising: a journal bearing including rolling elements and a cylindrical ring cooperating with the rolling elements; a thrust bearing including substantially cylindrical rolling elements, a flange extending radially outwardly from and being integral with the cylindrical ring and cooperating with the thrust bearing rolling elements on an annular support surface on the flange, and an annular rolling plate having a first face constituting a race for the thrust bearing rolling elements and a second face abutting the support surface, the radial extent of the support surface being less than the generatrices of the thrust bearing rolling elements.

2. A bearing as claimed in claim 1, wherein the annular support surface abutting the rolling plate is substantially in alignment with the centre region of said generatrices.

3. A combined thrust and journal bearing comprising: a journal bearing including rolling elements and a cylindrical ring cooperating with the rolling elements; a thrust bearing including rolling elements, a radially extending flange cooperating with the thrust bearing rolling elements on annular support surface on the flange, and an annular rolling plate having a first face constituting a race for the thrust bearing rolling elements and a second face abutting the support surface, the radial extent of the support surface being less than the generatrices of the thrust bearing rolling elements, and the annular support surface being formed on an annular boss on the flange.

4. A bearing as claimed in claim 1, wherein the support surface is plane.

5. A combined thrust and journal bearing comprising: a journal bearing including rolling elements and a cylindrical ring co-operating with the rolling elements; a thrust bearing including rolling elements, a radially extending flange cooperating with the thrust bearing rolling elements on annular support surface on the flange, and an annular rolling plate having a first face constituting a race for the thrust bearing rolling elements and a second face abutting the support surface, the radial extent of the support surface being less than the generatrices of the thrust bearing rolling elements, and the support surface being convex.

6. A combined thrust and journal bearing comprising: a journal bearing including rolling elements and a cylindrical ring cooperating with the rolling elements; a thrust bearing including rolling elements, a radially extending flange cooperating with the thrust bearing rolling elements on annular support surface on the flange, and an annular rolling plate having a first face constituting a race for the thrust bearing rolling elements and a second face abutting the support surface, the radial extent of the support surface being less than the generatrices of the thrust bearing rolling elements, and the boss having a hardness less than the cylindrical ring.

7. A combined thrust and journal bearing comprising: a journal bearing including rolling elements and a cylindrical ring cooperating with the rolling elements; a thrust bearing including rolling elements, a radially extending flange cooperating with the thrust bearing rolling elements on annular support surface on the flange, and an annular rolling plate having a first face constituting a race for the thrust bearing rolling elements and a second face abutting the support surface, the radial extent of the support surface being less than the generatrices of the thrust bearing rolling elements, and the support surface being toric.

8. A combined thrust and journal bearing comprising: a journal bearing including rolling elements and a cylindrical ring cooperating with the rolling elements; a thrust bearing including substantially cylindrical rolling elements, a flange extending radially outwardly from and being integral with the cylindrical ring and cooperating with the thrust bearing rolling elements on an annular support surface on the flange, and an annular rolling plate having a first face constituting a race for the thrust bearing rolling elements and a second face abutting the support surface the radial extent of the support surface being less than the generatrices of the thrust bearing rolling elements, and the support surface being immediately adjacent the cylindrical radially of the combined bearing ring, whereby when mounting the bearing it is possible to act on said support surface without deformation when fitting the cylindrical ring in the element receiving the combined bearing.

9. A combined thrust and journal bearing comprising: a journal bearing including rolling elements and a cylindrical ring cooperating with the rolling elements; a thrust bearing including substantially cylindrical rolling elements, a flange extending radially outwardly from and being integral with the cylindrical ring and cooperating with the thrust bearing rolling elements on an annular support surface on the flange, and an annular rolling plate having a first face constituting a race for the thrust bearing rolling elements and a second face abutting the support surface, the radial extent of the support surface being less than the generatrices of the thrust bearing rolling elements, the flange having an abutment surface adapted to be placed against a fixed surface of the element which receives the bearing said abutment surface being located on the opposite side of the flange to the support surface and at a greater distance from the axis of the bearing, than the support surface.

10. A bearing as claimed in claim 9, wherein the abutment surface is plane.

11. A combined thrust and journal bearing comprising: a journal bearing including rolling elements and a cylindrical ring cooperating with the rolling elements; a thrust bearing including rolling elements, a radially extending flange cooperating with the thrust bearing rolling elements on annular support surface on the flange, and an annular rolling plate having a first face constituting a race for the thrust bearing rolling elements and a second face abutting the support surface, the radial extent of the support surface being less than the generatrices of the thrust bearing rolling elements, and the abutment surface being convex.

12. A combined thrust and journal bearing comprising: a journal bearing including rolling elements and a cylindrical ring cooperating with the rolling elements; a thrust bearing including rolling elements, a radially extending flange cooperating with the thrust bearing rolling elements on annular support surface on the flange, and an annular rolling plate having a first face constituting a race for the thrust bearing rolling elements and a second face abutting the support surface, the radial extent of the support surface being less than the generatrices of the thrust bearing rolling elements, and the abutment surface being toric.

13. A combined thrust and journal bearing comprising: a journal bearing including rolling elements and a cylindrical ring cooperating with the rolling elements; a thrust bearing including rolling elements, a radially extending flange cooperating with the thrust bearing rolling elements on annular support surface on the flange, and an annular rolling plate having a first face constituting a race for the thrust bearing rolling elements and a second face abutting the support surface the radial extent of the support surface being less than the generatrices of the thrust bearing rolling elements, the flange having an abutment surface adapted to be placed against a fixed surface of the element which receives the bearing, said abutment surface being located on the opposite side of the support surface to the axis of the bearing, the flange extending beyond the abutment surface by a portion which coacts with and serves to center the annular rolling plate.

14. A bearing as claimed in claim 13, wherein said portion is cylindrical.

15. A bearing as claimed in claim 13, wherein said portion has a free edge comprising means for axially retaining the rolling plate.

16. A bearing as claimed in claim 13, further comprising a cage for guiding the thrust bearing rolling elements, said portion having a free edge comprising means for coacting with and axially retaining the cage located between the retaining means and the rolling plate.

17. A bearing as claimed in claim 13, wherein the said portion is radially spaced away from the rolling plate.

18. A combined thrust and journal bearing comprising: a journal bearing including rolling elements and a cylindrical ring cooperating with the rolling elements; a thrust bearing including substantially cylindrical rolling elements, a flange extending radially outwardly from and being integral with the cylindrical ring and cooperating with the thrust bearing rolling elements on an annular support surface on the flange, and an annular rolling plate having a first face constituting a race for the thrust bearing rolling elements and a second face abutting the support surface, the radial extent of the support surface being less than the generatrices of the thrust bearing rolling elements and the support surface abutting the rolling plate being substantially in alignment with the center region of said generatrices, and the thickness of the rolling plate is so chosen in accordance with the load, the length of the thrust bearing rolling elements and the shape of the support surface that it is capable of being elastically bent under the effect of the load and of the reaction of the support surface, whereby the load exerted on the ends of the thrust bearing rolling elements is reduced.

19. A bearing as claimed in claim 1, wherein the second face of the rolling plate is operatively connected to the journal bearing rolling elements so as to retain the latter axially.

20. A bearing as claimed in claim 1, the bearing further comprising a cage for guiding the journal bearing rolling elements, the second face of the rolling plate coacting with the cage so as to retain the latter axially.

21. A bearing as claimed in claim 1, the bearing further comprising a cage for guiding the journal bearing rolling elements, the rolling plate having a bore whose face coacts with the cage and centers cage.

22. A bearing as claimed in claim 1, wherein the second face of the rolling plate has an annular lip coacting with the adjacent ends of the journal bearing rolling elements for radially retaining the journal bearing rolling elements.

23. A bearing as claimed in claim 1, the bearing further comprising a cage for guiding the thrust bearing rolling elements, the rolling plate having means operatively connected to the cage for retaining the latter.

References Cited
UNITED STATES PATENTS 3,167,363   1/1965   Murphy _____ 308—174

MARTIN P. SCHWADRON, *Primary Examiner.*

FRANK SUSKO, *Examiner.*